US009438857B2

(12) United States Patent
Chen et al.

(10) Patent No.: US 9,438,857 B2
(45) Date of Patent: Sep. 6, 2016

(54) VIDEO CONFERENCING SYSTEM AND MULTI-WAY VIDEO CONFERENCE SWITCHING METHOD

(71) Applicant: Quanta Computer Inc., Taoyuan (TW)

(72) Inventors: Rong-Quen Chen, Taoyuan (TW); Yu-Hsing Lin, Taoyuan (TW); Kai-Ju Cheng, Taoyuan (TW); Chin-Yuan Ting, Taoyuan (TW); Hsin-Lun Hsieh, Taoyuan (TW); Yuan-Ruei Jhang, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 9 days.

(21) Appl. No.: 14/618,285

(22) Filed: Feb. 10, 2015

(65) Prior Publication Data

US 2016/0205347 A1    Jul. 14, 2016

(30) Foreign Application Priority Data

Jan. 8, 2015  (TW) .............................. 104100488 A

(51) Int. Cl.
*H04N 7/14*   (2006.01)
*H04N 7/15*   (2006.01)

(52) U.S. Cl.
CPC ...................................... *H04N 7/15* (2013.01)

(58) Field of Classification Search
CPC ...................................................... H04N 7/14
USPC .......... 348/14.01, 14.08, 14.11, 14.12, 14.09
See application file for complete search history.

(56) References Cited

U.S. PATENT DOCUMENTS

| 8,861,701 | B2* | 10/2014 | Abuan ................ H04L 12/1827 |
| | | | 348/14.08 |
| 2008/0002818 | A1* | 1/2008 | Kashimoto ......... H04L 12/1818 |
| | | | 379/202.01 |
| 2015/0092010 | A1* | 4/2015 | Liu .......................... H04N 7/15 |
| | | | 348/14.08 |
| 2015/0271447 | A1* | 9/2015 | Glass ..................... H04N 7/147 |
| | | | 348/14.09 |

* cited by examiner

*Primary Examiner* — Olisa Anwah
(74) *Attorney, Agent, or Firm* — McClure, Qualey & Rodack, LLP

(57) ABSTRACT

A video conferencing system is provided. The video conferencing system includes: a first video conferencing terminal; a second video conferencing terminal, for establishing a video conference with the first video conferencing terminal via a peer-to-peer connection; and a management server. When a user needs to add a third video conferencing terminal to the video conference to establish a multi-way video conference, the first video conferencing terminal and the second video conferencing terminal automatically terminate the peer-to-peer connection, and connect to the third video conferencing terminal through the management server to perform the multi-way video conference.

6 Claims, 3 Drawing Sheets

VIDEO CONFERENCING SYSTEM AND MULTI-WAY VIDEO CONFERENCE SWITCHING METHOD

CROSS REFERENCE TO RELATED APPLICATIONS

This Application claims priority of Taiwan Patent Application No. 104100488, filed on Jan. 8, 2015, the entirety of which is incorporated by reference herein.

BACKGROUND OF THE INVENTION

1. Field of the Invention

The present invention relates to video conferencing, and, in particular, to a video conferencing system and a multi-way video conference switching method.

2. Description of the Related Art

With advances in technology, users located in different locations may exchange information using a video conference. However, when a video conference is established between two users, a peer-to-peer connection is conventionally used in the video conference. If another user wants to join the video conference, the two users in the video conference have to manually hang up the peer-to-peer connection of the video conference, and a multi-way control system is used as an intermediary to connect three or more users, and the multi-way control system has to resend invitations to all the participants of the multi-way video conference, resulting in inconvenience for the users. Accordingly, there is demand for a video conferencing system to solve the aforementioned issue.

BRIEF SUMMARY OF THE INVENTION

A detailed description is given in the following embodiments with reference to the accompanying drawings.

In an exemplary embodiment, a video conferencing system is provided. The video conferencing system includes: a first video conferencing terminal; a second video conferencing terminal, for establishing a video conference with the first video conferencing terminal via a peer-to-peer connection; and a management server. When a user needs to add a third video conferencing terminal to the video conference to establish a multi-way video conference, the first video conferencing terminal and the second video conferencing terminal automatically terminate the peer-to-peer connection, and connect to the third video conferencing terminal through the management server to perform the multi-way video conference.

In another exemplary embodiment, a multi-way video conference switching method for use in a video conferencing system is provided. The video conferencing system comprising a first video conferencing terminal, a second video conferencing terminal, and a management server. The method includes the steps of: establishing a video conference between the first video conferencing terminal and the second video conferencing terminal via a peer-to-peer connection; automatically terminating the peer-to-peer connection between the first video conferencing terminal and the second video conferencing terminal when the user needs to add a third video conferencing terminal to the video conference to establish a multi-way video conference; and connecting the first video conferencing terminal and the second video conferencing terminal to the third video conferencing terminal through the management server to perform the multi-way video conference.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
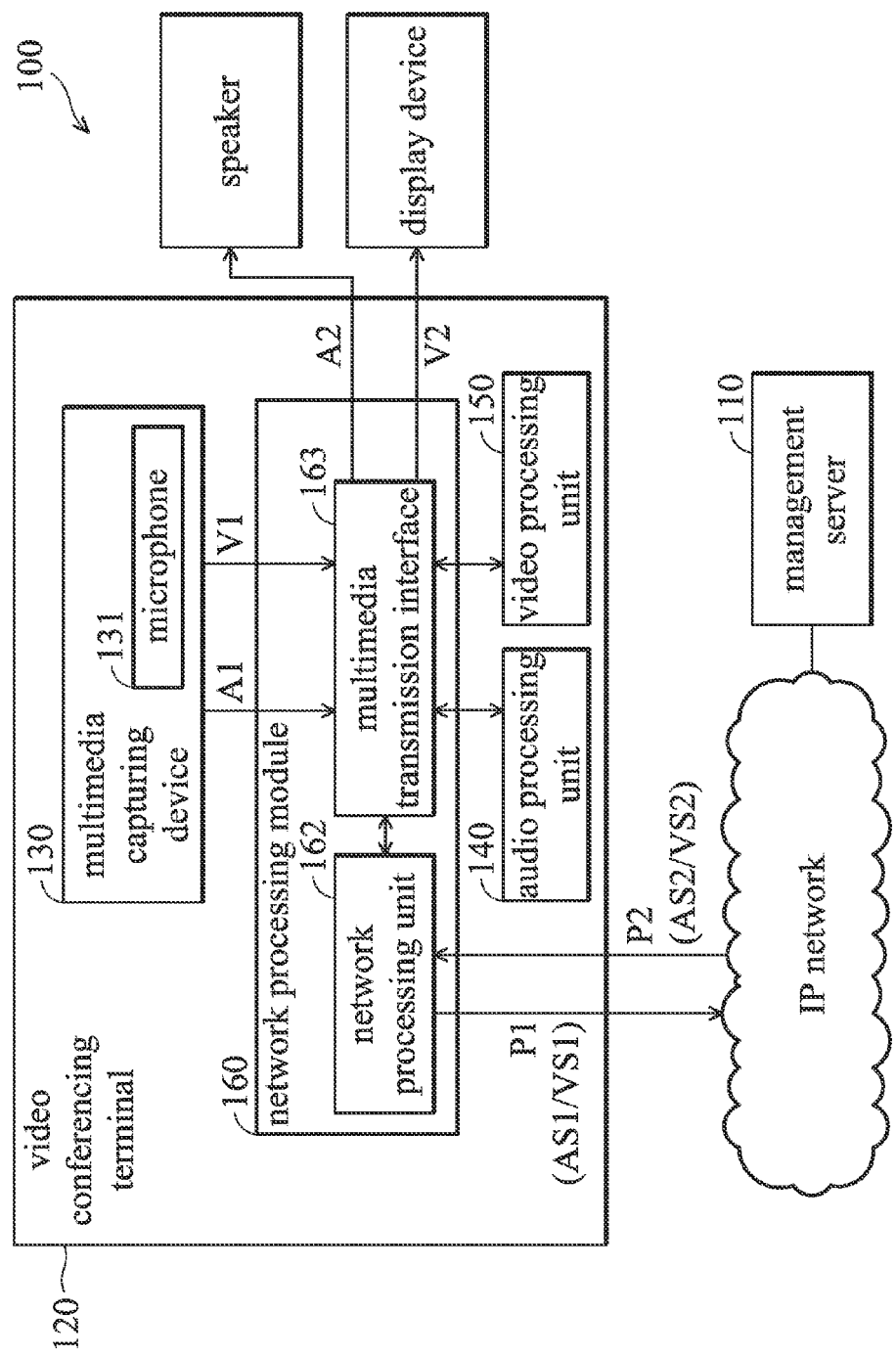
FIG. 1 is a block diagram of a video conferencing system in accordance with an embodiment of the invention.

FIG. 1 is a block diagram of a video conferencing system in accordance with an embodiment of the invention. The video conferencing system 100 comprises a management server 110, and a video conferencing terminal 120. The video conferencing terminal 120 is connected to the management server 110 and another video conferencing terminal for exchanging video/audio signals via an IP network (e.g. LAN, Intranet, Internet, a radio telecommunications network, or a public switched telephone network), the details of which will be provided later.

The management server 110 can be regarded as a multi-point control unit (MCU), which is configured to provide services to users, so that the users may log onto the management server 110 and retrieve an associated user list for establishing a video conference. For example, different users may join the same group, and the management server 110 may provide an online user list to the members in the same group who have logged onto the management server 110. In addition, a user may also add other users to his private user list, and the management server 110 also provides a list indicating the online status of the users in the private user list. When user A wants to establish a video conference with user B in user A's private user list, and user B has accepted the request for establishing the video conference, the management server 110 may forward the user information associated with user B, such as the user name and the corresponding IP address, to the video conferencing terminal 120 of user A to establish the video conference.

The video conferencing terminal 120 comprises a multimedia capturing device 130, an audio processing unit 140, a video processing unit 150, and a network processing module 160. The multimedia capturing device 130 may be an optical sensor, such as a CCD sensor or a CMOS sensor, configured to capture images of a user and output a video signal V1. The multimedia capturing device 130 further comprises a microphone 131 configured to receive voices from the user and output an audio signal A1. The audio processing unit 140 receives the audio signal A1 from the microphone 111 via the network processing module 160, and encodes the audio signal A1 to an audio stream AS1. The video processing unit 150 receives the video signal V1 from the multimedia capturing device 130, and encodes the video signal V1 to a video stream VS1. The network processing module further transmits the video stream VS1 and the audio stream AS1 to a network packet P1, and exchanges the network packet P1 with another video conferencing terminal through an IP network, thereby establishing a video conference.

The network processing module 160 comprises a network processing unit (NPU) 162, a multimedia transmission interface 163. The network processing unit 162 receives the video stream VS1 from the video processing unit 150 and the audio stream AS1 from the audio processing unit 140, encodes the video stream VS1 and the audio stream AS1 to a network packet P1, and transmits the network packet P1 to the video conferencing terminal of other users on the IP network. In addition, the network processing unit 162 further receives the network packet P2 from another video conferencing terminal on the IP network, wherein the network packet P2 comprises a video stream VS2 and an audio stream AS2. The video processing unit 150 and the audio processing unit 140 decode the video stream VS2 and the audio stream AS2 to generate a video signal V2 and an audio signal A2, respectively. The video processing unit 150 may display the video signal V2 via a display device, and the audio processing unit 140 may play the audio signal A2 via another speaker.

The network processing unit 162 is compatible with various wired/wireless communications protocols, such as a local area network (LAN), an intranet, the Internet, a radio telecommunications network, a public switched telephone network, Wifi, an infrared ray, Bluetooth, etc., but the invention is not limited thereto. The network processing unit 162 may control the real-time media sessions and coordinate the network transfer flows between each user in the video conference. The multimedia transmission interface 163 is compatible with various transmission interfaces, such as USB and HDMI, for transmitting and receiving the video/audio signals.

Figure 2A:
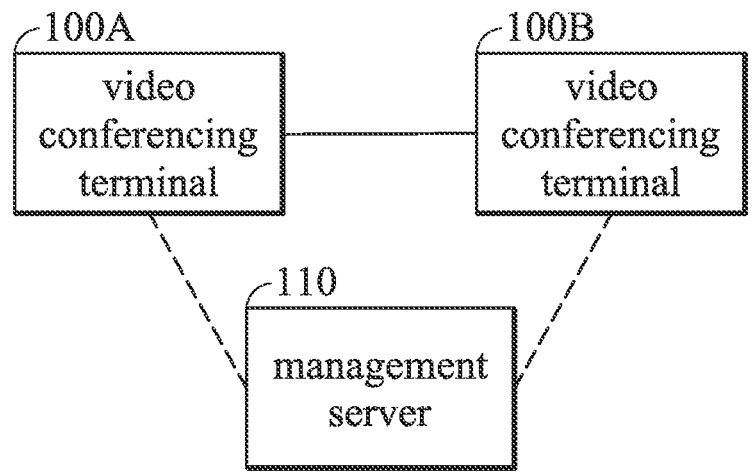
FIG. 2A is a diagram illustrating a one-to-one video conference using the video conferencing terminals in accordance with an embodiment of the invention.
Figure 2B:
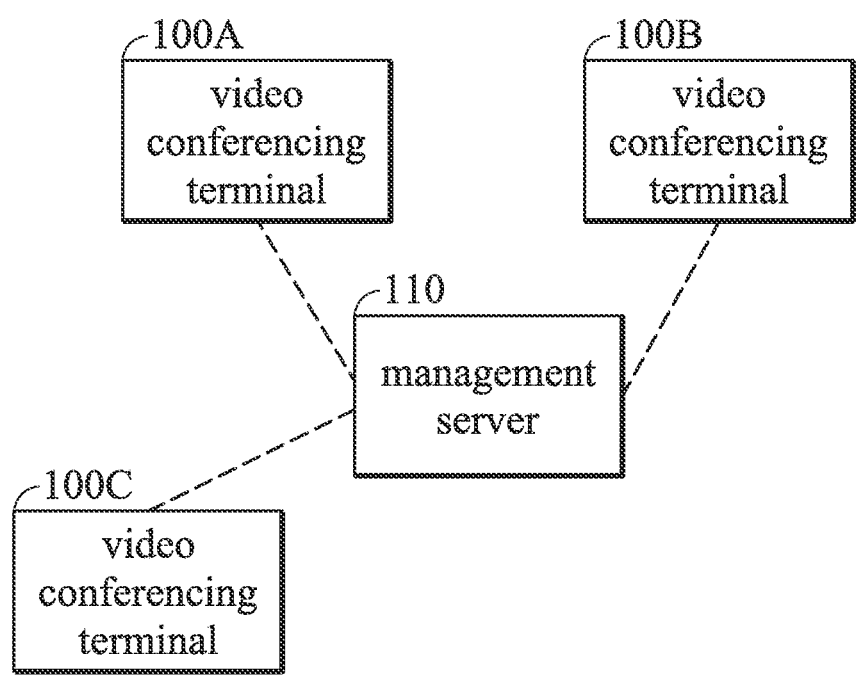
FIG. 2B is a diagram illustrating a multi-way video conference using the video conferencing terminals in accordance with an embodiment of the invention.

FIG. 2A is a diagram illustrating a one-to-one video conference using the video conferencing terminals in accordance with an embodiment of the invention. FIG. 2B is a diagram illustrating a multi-way video conference using the video conferencing terminals in accordance with an embodiment of the invention. As shown in FIG. 2A, user A and user B have established a peer-to-peer video conference using the video conferencing terminals 100A and 100B, respectively. The video conferencing terminals 100A and 100B are identical to the video conferencing terminal 120 as shown in FIG. 1. When user A wants to set up the peer-to-peer video conference to a multi-way video conference on the video conferencing terminal 100A, the video conferencing terminal 100A transmits a setup command to the management server 110. The management server 110 may respond to the video conferencing terminal 100A whether the multi-way video conference is allowed based on the current load. If the multi-way video conference is allowed, user A may select the user to be added into the multi-way video conference from the user list displayed on the video conferencing terminal 100A. For example, the icon of user C can be dragged to the window of the video conference.

Meanwhile, the video conferencing terminal 100A transmits a CONNECT command to the management server 110, and the management server 110 transmits an INVITE command to the video conferencing terminal 100C of user C. When user C accepts the invitation from user A to join the multi-way video conference via the video conferencing terminal 100C, the video conferencing terminal 100A automatically terminates the peer-to-peer connection between the video conferencing terminals 100A and 100B, and rebuilds the connection to the video conferencing terminals 100B and 100C through the management server 110, as shown in FIG. 2B. Accordingly, user A and user B will not perceive that the original peer-to-peer video conference has been terminated when user C has been added into the multi-way video conference.

Figure 3:
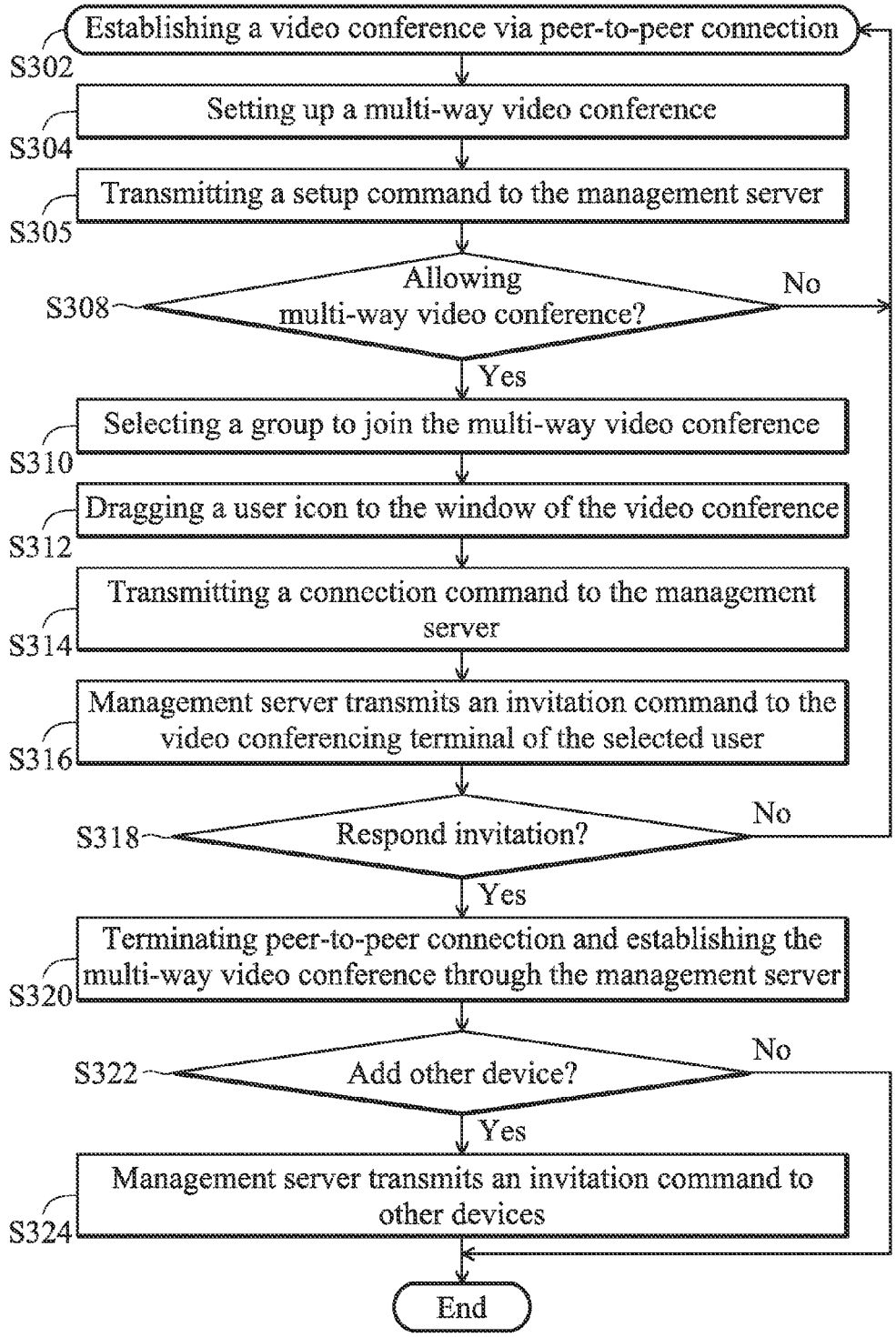
FIG. 3 is a flow chart of a multi-way video conference switching method in accordance with an embodiment of the invention.

FIG. 3 is a flow chart of a multi-way video conference switching method in accordance with an embodiment of the invention. Referring to FIG. 1, FIG. 2B and FIG. 3, in step S302, a first video conferencing terminal of a first user (e.g. the video conferencing terminal 100A of user A) has established a peer-to-peer video conference with a second video conferencing terminal of a second user (e.g. the video conferencing terminal 100B of user B). In step S304, the first user chooses to set up the peer-to-peer video conference to a multi-way video conference. In step S306, the first video conferencing terminal transmits a setup command to the management server 110. In step S308, the management server 110 determines whether to allow the multi-way video conference according to current conditions (e.g. system resources, network load, etc.). If the multi-way video conference is allowed, step S310 is performed. Otherwise, step S302 is performed, and the peer-to-peer video conference continues.

In step S310, the management server 110 provides a group list to the first user for selecting a group. In step S312, the first user drags the icon of a third user in the selected group to the window of the peer-to-peer video conference. In step S314, the first video conferencing terminal transmits a connection command to the management server 110. In step S316, the management server 110 transmits an invitation command to a third video conferencing terminal of the third user. In step S318, the third user determines whether to respond to the invitation command on the third video conferencing terminal. If the third user determines to respond to the invitation command, step S320 is performed. If the third user determines not to respond to the invitation command, step S302 is performed and the peer-to-peer video conference continues.

In step S320, the first video conferencing terminal and the second video conferencing terminal automatically terminate the peer-to-peer video conference, and build a multi-way video conference through the management server 110. In step S322, the management server 110 determines whether any other device is added into the multi-way video conference by the first video conferencing terminal. If so, step S324 is performed. Otherwise, the flow ends. In step S324, the management server 110 transmits an invitation command to other devices recently added into the multi-way video conference, and the details can be referred to in steps S312~S318. It should be noted that if a three-way video conference has been established, the newly added device is still connected to the existing video conferencing terminals through the management server 110.

In view of the above, a video conferencing system and a multi-way video conference switching method are provided. A user may add other users into the video conference when a peer-to-peer video conference has been originally established. In addition, the peer-to-peer video conference can be switched to a multi-way video conference without hanging up the video call, and the participants of the video conference will not perceive that the connection has been terminated.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conferencing system, comprising:
   a first video conferencing terminal;
   a second video conferencing terminal, for establishing a video conference with the first video conferencing terminal via a peer-to-peer connection; and
   a management server,
   wherein when a user needs to add a third video conferencing terminal to the video conference to establish a multi-way video conference, the first video conferencing terminal and the second video conferencing terminal automatically terminate the peer-to-peer connection, and connect to the third video conferencing terminal through the management server to perform the multi-way video conference,
   wherein when the user adds the third video conferencing terminal to the video conference to establish the multi-way video conference, the first video conferencing terminal transmits a setup command to the management server, and the management server further determines whether to allow the multi-way video conference,
   wherein when the management server determines to allow the multi-way video conference, the management provides a group list to the user for selecting a group, and the selected group comprises at least one member.

2. The video conferencing system as claimed in claim 1, wherein when the user drags an icon of the member in the selected group to a window of the video conference, the first video conferencing terminal transmits a connection command to the management server, and the management server further transmits an invitation command to the third video conferencing terminal.

3. The video conferencing system as claimed in claim 2, wherein when the third video conferencing terminal accepts the invitation command, the first video conferencing terminal and the second video conferencing terminal automatically terminate the peer-to-peer connection, and connect to the third video conferencing terminal through the management server to perform the multi-way video conference, wherein the management server further determines whether any other device is added to the multi-way video conference.

4. A multi-way video conference switching method for use in a video conferencing system, wherein the video conferencing system comprising a first video conferencing terminal, a second video conferencing terminal, and a management server, the method comprising:
   establishing a video conference between the first video conferencing terminal and the second video conferencing terminal via a peer-to-peer connection;
   automatically terminating the peer-to-peer connection between the first video conferencing terminal and the second video conferencing terminal when a user needs to add a third video conferencing terminal to the video conference to establish a multi-way video conference;
   connecting the first video conferencing terminal and the second video conferencing terminal to the third video conferencing terminal through the management server to perform the multi-way video conference;
   when the user adds the third video conferencing terminal to the video conference to establish the multi-way video conference, utilizing the first video conferencing terminal to transmit a setup command to the management server;
   utilizing the management server to determine whether to allow the multi-way video conference; and
   when the management server determines to allow the multi-way video conference, utilizing the management to provide a group list to the user for selecting a group, wherein the selected group comprises at least one member.

5. The method as claimed in claim 4, further comprising:
   when the user drags an icon of the member in the selected group to a window of the video conference, utilizing the first video conferencing terminal to transmit a connection command to the management server; and
   utilizing the management server to transmit an invitation command to the third video conferencing terminal.

6. The method as claimed in claim 5, further comprising:
   when the third video conferencing terminal accepts the invitation command, automatically terminating the peer-to-peer connection between the first video conferencing terminal and the second video conferencing terminal;
   connecting the first video conferencing terminal and the second video conferencing terminal to the third video conferencing terminal through the management server to perform the multi-way video conference; and
   utilizing the management server to determine whether any other devices are added to the multi-way video conference.

* * * * *